(12) United States Patent
Behl et al.

(10) Patent No.: US 7,676,557 B1
(45) Date of Patent: Mar. 9, 2010

(54) DYNAMICALLY ADAPTIVE PORTLET PALETTE HAVING USER/CONTEXT CUSTOMIZED AND AUTO-POPULATED CONTENT

(75) Inventors: Stefan Behl, Holzgerlingen (DE); Stephan Hesmer, Gaertringen (DE); Timo Kussmaul, Boeblingen (DE); Andreas Nauerz, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/355,070

(22) Filed: Jan. 16, 2009

(51) Int. Cl.
*G06F 15/177* (2006.01)

(52) U.S. Cl. ..................... 709/220; 709/222

(58) Field of Classification Search ................. 709/220
See application file for complete search history.

(56) References Cited

U.S. PATENT DOCUMENTS

| | | | |
|---|---|---|---|
| 7,536,637 B1 * | 5/2009 | Nauerz et al. | 715/230 |
| 2003/0167315 A1 * | 9/2003 | Chowdhry et al. | 709/218 |
| 2004/0153373 A1 * | 8/2004 | Song et al. | 705/26 |
| 2004/0183831 A1 | 9/2004 | Ritchy et al. | |
| 2005/0065913 A1 * | 3/2005 | Lillie et al. | 707/3 |
| 2006/0036734 A1 * | 2/2006 | Breeden et al. | 709/225 |
| 2006/0225094 A1 * | 10/2006 | Facemire et al. | 725/45 |
| 2006/0235935 A1 * | 10/2006 | Ng | 709/208 |
| 2007/0006016 A1 | 1/2007 | Allamaraju | |
| 2007/0209011 A1 | 9/2007 | Padmanabhuni et al. | |
| 2007/0283020 A1 * | 12/2007 | Chowdary et al. | 709/227 |
| 2008/0033988 A1 | 2/2008 | Narayan et al. | |
| 2008/0046825 A1 | 2/2008 | Bedi et al. | |
| 2008/0183720 A1 * | 7/2008 | Brown et al. | 707/10 |
| 2008/0201645 A1 * | 8/2008 | Francis et al. | 715/742 |
| 2009/0006971 A1 * | 1/2009 | Guido et al. | 715/733 |
| 2009/0024944 A1 * | 1/2009 | Louch et al. | 715/765 |
| 2009/0063502 A1 * | 3/2009 | Coimbatore et al. | 707/10 |

OTHER PUBLICATIONS

Allen, R., "Portals and Portlets 2003" Technical Report UKeS-2004-06. CCLRS 2003-4.

* cited by examiner

*Primary Examiner*—Jeffrey Pwu
*Assistant Examiner*—Kevin S Mai
(74) *Attorney, Agent, or Firm*—Patents on Demand, P.A.; Brian K. Buchheit

(57) ABSTRACT

An event to initialize a portlet palette within a user interface having an open portal to which the portlet palette is associated can be detected. The portlet palette can be a user interface control that includes a portlet set of at least one portlet. The portlet palette can be configured so that a selection of a portlet from the portlet set causes the portlet to be added to the open portal. A set of portlets can be automatically determined from a set of stored portlets that are relevant to the open portal based upon previously defined programmatic rules and contextual information associated with the open portlet. The portlet palette can be dynamically populated with the determined set of portlets. The populated portlet palette can be presented within the user interface.

9 Claims, 8 Drawing Sheets

DYNAMICALLY ADAPTIVE PORTLET PALETTE HAVING USER/CONTEXT CUSTOMIZED AND AUTO-POPULATED CONTENT

BACKGROUND OF THE INVENTION

The present invention relates to the field of portal development tools and, more particularly, to dynamically adaptive portlet palette having user/context customized and auto-populated content.

Portals are containers that contain customizable portlets, each of which is linked to a portlet specific data source. To customize a portal, users access a portlet palette, which contains a listing of available portlets. The user can select (e.g., drop-and-drag) portlets from the palette and place them on the customizable portal, to add the portlet to the portal. Existing portlet palettes can provide a static listing of default portlets that is presented to all users and/or can provide an ability to manually modify the portlets provided within the palette. Current portlet palettes do not automatically adapt to user or request context.

FIG. 1 (Prior Art) is a schematic diagram of a view of a typical portal server 100 implementation. The portal server 100 includes logical components for user authentication 105, state handling 110, and aggregation 115 of fragments, a set of portlets 120, portlet container software 135, portal storage resources 140, and the like. The logic components are operatively connected such that data can be exchanged between single components as required. The server 100 can realizes a request/response communication pattern (i.e. it can waits for client requests and responds to these requests). A client request message can include a Uniform Resource Locator (URL)/Uniform Resource Identifier (URI) which addresses the requested portal page and/or other portal resources.

Server 100 can include a manual layout interface 160, a model management component 161, and a portal palette 165. Portlet palette 165 can be a graphical representation of a set of portlets 120 that a user can add to a portal page 125 through user interactions. The portlet palette 165 can be easier for many users to utilize than the manual layout interface 160, which results in palette 165 being a preferred interface for customizing portals.

FIG. 2 (Prior Art) shows a data flow 200 of interactions in a portal during render request processing. Illustrated interactions involve a client 210, a portal 212, a portal container 214, and a set of portlets 216 A, B, and C. In flow 200, client 210 can issues a request 220 (e.g., for a new page). For example, a user can click on a link for creating a new page, where the link can be displayed in a portal configuration browser window. The portal 212 can receive the request 220 that invokes state handling and conveys the request 222 to portal container 214. The state handling operations can determine the aggregation state and the portlet state that is encoded in/associated with the URL. The portal container 214 can perform an aggregation check to see if a derived page exists for a current user. A page can be loaded according to a page definition obtained from the portal database. The portlets 216 referenced in this page definition (i.e. that are contained on the page) can be determined. A render request 224 can be sent to each determined portlet 216. Each portlet (Portlet A, B and C) can create its own markup independently and can return the markup fragment within a request response 226. The responses 226 can be conveyed through container 214 to portal 212. The portal 212 can provide 228 a browser render able portal page to client 210.

DETAILED DESCRIPTION OF THE INVENTION

Figure 1:
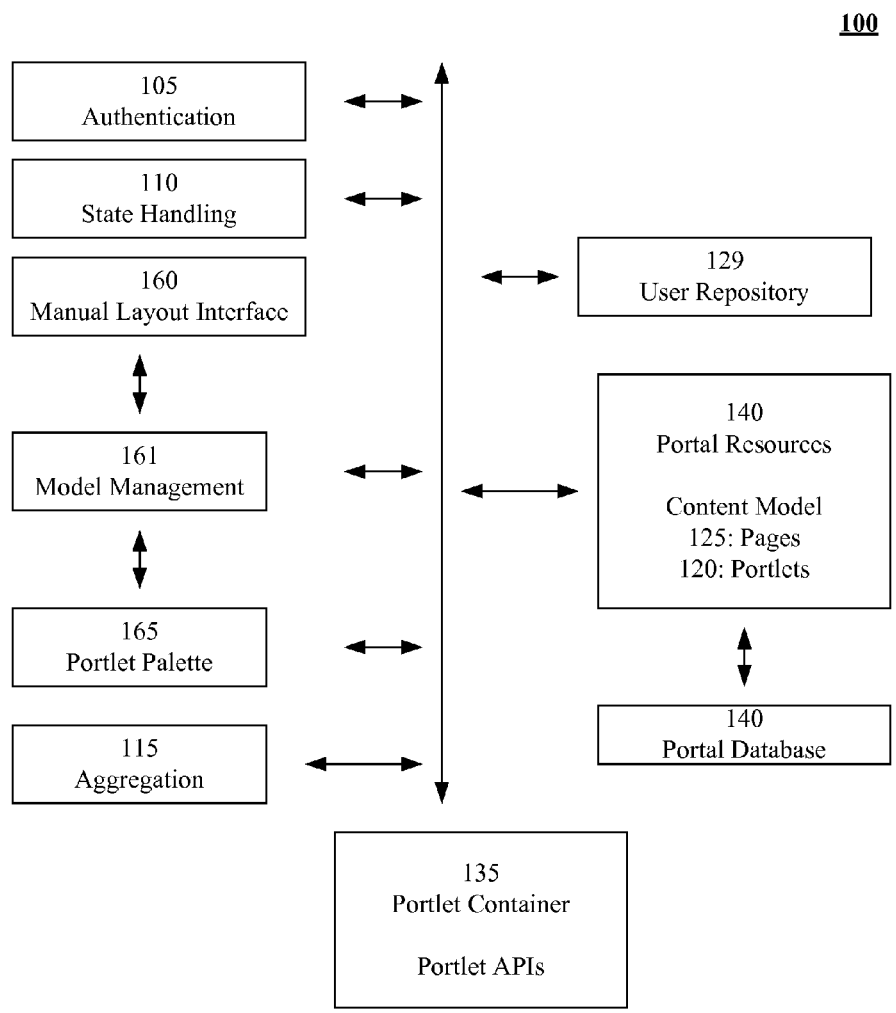
FIG. 1 (Prior Art) is a schematic diagram of a view of a typical portal server implementation.
Figure 2:
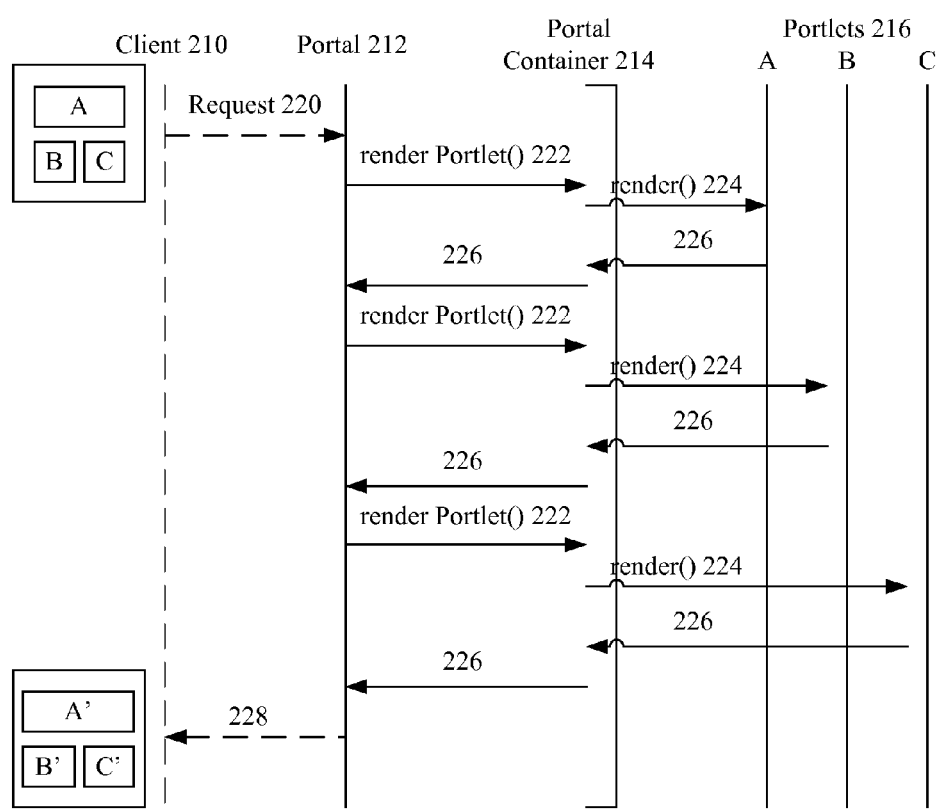
FIG. 2 (Prior Art) shows a data flow of interactions in a portal during render request processing.

The present invention provides a portlet palette that dynamically auto-populates portlets listed in the palette based upon user and/or context specific considerations. In one embodiment, portlets can be placed in the portal palette based at least in part upon semantic tags. The semantic tags can be associated with each portlet and optionally with the portal itself. Each semantic tag can semantically describe the "purpose" of the portlet, where tag content can be based upon user provided keywords, comments, other user entered data, or data automatically inferred based upon user specific behavior. Semantic tags associated with a current portal and/or included portlets can be compared against semantic tags associated with a set of stored, yet available portlets. Portlets similar to the existing ones (based upon matching terms contained in the semantic tags) can be automatically presented within the portlet palette. As semantic tags of the portlets change and/or as the portlets included in the portal changes, the portlets listed in the portlet palette can dynamically adjust.

In another embodiment, portlets to be placed in the portlet palette can be selected based upon a set of portlets that have proven to be of use to other users. An assumption is that similarly positioned users will often want to configure a portal (including using a similar set of portlets) in a similar manner with each other. Any of a variety of techniques can be used to determining similarity among a set of users, such as using social networking data to programmatically ascertain user-to-user correspondences. These correspondences can be based generically upon strength of relationships among users and/or can be based upon portlet specific data (such as comparing a "purpose" of a given portlet against a relationship factor that shows the users share that purpose). Once a user-to-user similarity is discovered, a portal database can be queried to determine portal configurations used by the "similar"

users. Portlets used within portals of similar users can be presented (within a dynamically populated portlet palette) to a user who is configuring their own portal.

It should be emphasized, that the portlet palette can be dynamically populated using any programmatically definable technique and that the invention is not to be limited in scope to a semantic tag based technique or to a user similarity based technique. For example, in another contemplated embodiment, user browser behavior and activity can be monitored and logged to infer a set of portlets likely to be of interest to the user, where the portlet palette is dynamically populated with those likely candidates. Further, multiple techniques can be combined to determine a set of dynamically presented portlets.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 3:
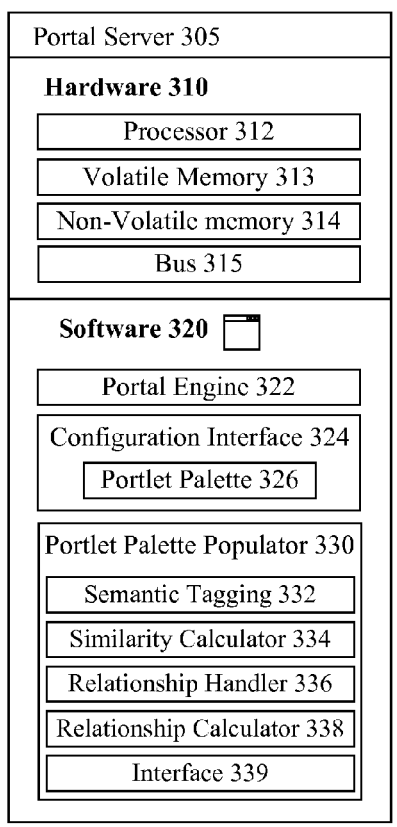
FIG. 3 is a schematic diagram showing a system for portals able to be customized using a dynamically populated portlet palette in accordance with an embodiment of the inventive arrangements disclosed herein.
Figure 3:
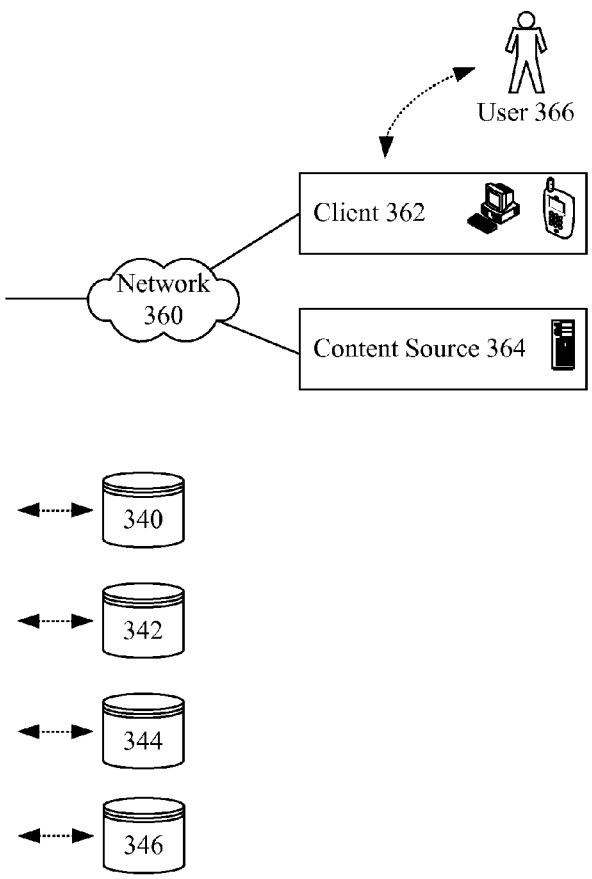

FIG. 3 is a schematic diagram showing a system 300 for portals able to be customized using a dynamically populated portlet palette in accordance with an embodiment of the inventive arrangements disclosed herein. In system 300, a portal server 305 containing hardware 310 and software 320 can serve portals to clients 362 over network 360. Each served portal can include a set of portlets, which can include uniform resource identifier (URI) addressed content associated with a portlet specific content source 364.

Each user 366 can utilize a configuration interface 324 to customize portals in user specific fashions. The user customizations can be stored in a data store 340 and can be applied by a portal engine 322 at runtime when portals are served. The configuration interface 324 can include a portlet palette 326, which provides a list of portlets from which the user 366 utilizing the interface 324 can choose. For example, a user 366 can add new portlets to a customized portal by dropping and dragging portlets from the palette 326 into a portal construction canvas (or into the portal interface instance itself, which this interface is the construction canvas). A model management component of server 305 can perform the programmatic actions to create the user portal customizations stored in data store 340 based upon user interactions involving the palette 326.

Unlike conventional portlet palette 326 implementations, the list of portlets provided in the palette 326 can be dynamically populated at runtime using the portlet palette populator component 330. The populator 330 can select a set of available portlets stored in an accessible portlet repository 342 based upon context of use and/or user specific factors.

In one embodiment, the palette 326 can be populated based upon comparisons between semantic tags associated with a current portal and semantic tags associated with available portlets. Semantic tagging 332 component can permit a user 366, authorized administrator, or automated software agent to establish semantic tags for portlets and/or portals, which can be stored in tag data store 344. A similarity calculator 334 can determine correspondence strength between the semantic tags of a current portal and available portlets 342 and can provide a ranked set of portlets based upon these semantic tag similarities. The ranked set of portlets can be included (in ranked order) in the portlet palette 326.

In another embodiment, the palette 326 can be populated based upon selections used by users similar to a current user 366. For example, a set of users having user specific portal configurations stored in data store 340 can be examined to determine if a strong relationship exists between these users and user 366. Relationship strength can be determined based upon social networking data stored in data store 346. A relationship calculator 338 can determine a strength of relationship. The relationship handler 336 can query stored user configurations involving portlets and can generate a ranked set of available portlets from data store 342. Portal configurations of users having relatively strong relationships with user 366 are given greater relative weight than those portal configurations associated with users having weaker relationships with user 366. In one embodiment, the data store 344 can be a social network maintained data store, in which case an interface 339 (e.g., application program interface) may be needed for querying relationship data from data store 346.

The hardware 310 of server 305 can include at least one processor 312, at least one volatile memory 313, and at least one non-volatile memory 314, linked to one another by bus 315. The one or more processors 312 can include one or more cores, which are interconnected to each other. The cores can be contained in a single processing die and/or can be contained in separate processor dies linked to one another through a multi-processor capable motherboard. In one embodiment, the computing device 305 can be a virtual computing device having one or more defined processors 312, which may or may not map to discrete physical processors. A virtual device can include a distributed computing device and/or a software emulated device.

The non-volatile memory 314 can store software 320. Non-volatile memory 314 can include a solid state disk (SSD), a set of one or more hard drives (magnetic disks), optical disks, plastic disks, magnetic tape, memsistors, and the any other storage medium capable of retaining digitally encoded data. The volatile memory 313 can store data elements processed by processor 312. The volatile memory 313 can include Random Access Memory (RAM) and other types of storage mediums capable of temporarily storing data.

Client 362 can be any computing device capable of interacting with portal server 305. The client 362 can include a browser with renders portals provided by server 305. Client 362 can include, but is not limited to, a personal computer, a mobile phone, a kiosk, a Web tablet, a navigation system, a media player, an embedded computing device, and the like. Content source 362 can be a Web content source able to server Uniform Resource Identifier (URI) addressed content.

Network 360 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 360 can include local components and data pathways necessary for communications to be exchanged among computing device components and between integrated device components and peripheral devices. The network 360 can also include network equipment, such as routers, data lines, hubs, and intermediary servers which together form a packet-based network, such as the Internet or an intranet. The network 360 can further include circuit-based communication components and mobile communication components, such as telephony switches, modems, cellular communication towers, and the like. The network 360 can include line based and/or wireless communication pathways.

Each of the data stores 340, 342, 344 can be physically implemented within any type of hardware including, but not limited to, a magnetic disk, an optical disk, a semiconductor memory, a digitally encoded plastic memory, a holographic memory, or any other recording medium. The data stores 340, 342, 344 can be a stand-alone storage unit as well as a storage unit formed from a plurality of physical devices, which may be remotely located from one another. Additionally, information can be stored within each data store in a variety of manners. For example, information can be stored within a database structure or can be stored within one or more files of a file storage system, where each file may or may not be indexed for information searching purposes.

Figure 4:
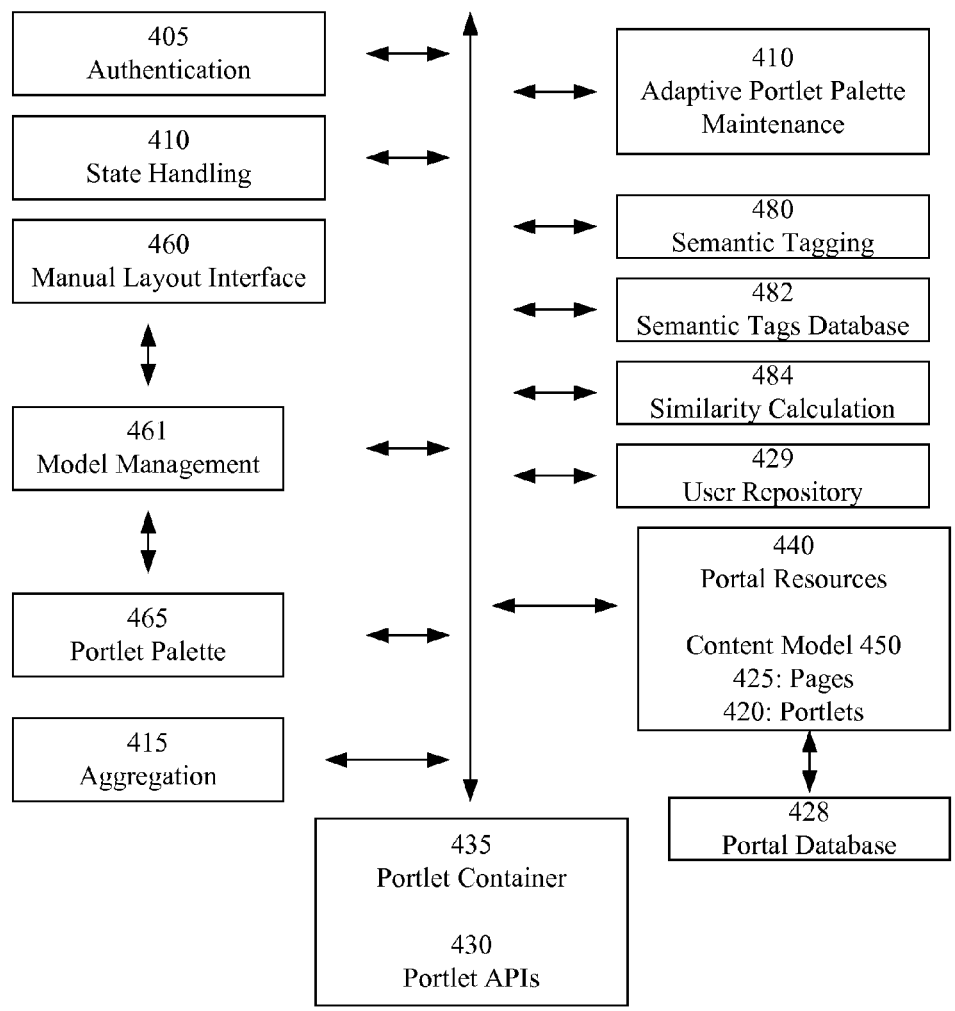
FIG. 4 is a schematic diagram of a portal server that dynamically populates a portlet palette based upon semantic tags in accordance with an embodiment of the inventive arrangements disclosed herein.

FIG. 4 is a schematic diagram of a portal server 400 that dynamically populates a portlet palette based upon semantic tags in accordance with an embodiment of the inventive arrangements disclosed herein. Server 400 can be one embodiment for implementing components of system 300. Server 400 includes many logical components existent in conventional portal servers, such as user authentication 405, state handling 410, aggregation 415 of fragments, a set of portlets 420, a user repository 429, portlet container software 435, portal storage resources 440, a manual layout interface 460, a model management component 461, and a portal palette 466. Additionally, server 400 can include an adaptive portlet populator 412, a semantic tagging component 480, a semantic tags database 482, and a similarity calculator 484. The adaptive portlet populator 412 can realizes the automatic maintenance of the adaptive portlet palette.

The semantic tagging component 480 can allow an administrator or a user to associate portal resources including portlets and pages with semantic tags (i.e. user assigned metadata semantically describing the purpose of the tagged component, which can be a page or a portlet). A semantic tag can include a keyword or term associated with or assigned to a piece of information, thus describing the item and enabling keyword-based enhanced information processing like classification and search of information. Component 480 can leverage various existing semantic tagging techniques utilized for tagging Web content. For example, many browsers permit user to add semantic tags to later find Web content. No known technique, however, utilities semantic tags as a factor to automatically populate a portlet palette 465. The semantic tagging component 480 can store semantic tags in the semantic tags database 482. The database 482 can represent a relational database management (RDBMS) database or any index able storage repository able to maintain data in a searchable fashion. In the database 482, the tags can remain associated with the user who performed the association. In one embodiment, the semantic tagging component 480 used in conjunction with database 482 can offer functionality to query the tags that a certain user has created.

The similarity calculation component 440 offers functionality to calculate correspondence strength (e.g., similarities and differences) between different semantic tags. This can be based on an underlying taxonomy or based on text processing techniques. The similarity calculation 440 can provide two principal functions: (1) to calculate a numerically represented similarity factor between two sets of tags; and (2) to retrieve a set of tags that are similar (according to a passed similarity factor) to a given set of tags.

As shown in FIG. 4, the server 400 can be implemented within an accessible network server of a standardized environment, such as a J2EE based environment. For example, server 400 can be a WEBSPHERE PORTAL SERVER, a BEA PORTAL SERVER, and the like. Server 400 can implement an aggregation of portlets 430 based on the underlying portal model 450. This model can include a hierarchy of portal pages 425 that may include portlets and portal information such as security settings, user roles, customization settings, and device capabilities. Within the rendered page, the portal can automatically generate the appropriate set of navigation elements based on the portal model 450. The portal engine can invoke portlets during the aggregation as required. The portal engine can uses caching to reduce the number of requests made to portlets. The application server 400 can employ open interface standards, such as the JAVA Portlet Application Program Interface (API) 430 (application programming interface). The server 400 can also support the use of a remote portlets via the WEBSPHERE REMOTE PROTOCOL (WSRP) or other remote access standard.

The portlet container 435 can be a single control component competent for all portlets 420, which may control the execution of code residing in each of these portlets 420. Container 435 can provide the runtime environment for the portlets and facilities for event handling, inter-portlet messaging, and access to portlet instance and configuration data, among others. The portal resources 440 can be particular to the portlets 420 themselves and the pages 425 on which the resources 440 are aggregated.

A manual layout interface 460 can be used for this purpose. In one embodiment, manual layout interface 460 can be a graphical user interface (GUI) that permits an adjustment of settings that control the visual appearance of the portal pages (e.g. by creating new pages, by adding or removing portlets on pages). Interface 460 can invoke a model management component 461, which can include functionality for performing persistent content model changes. An API can be used for invoking this functionality. In one embodiment, when an administrator or a user modifies a page 425 via interface 460, model management component 461 can create a derivation of the page 425 and can stores the derivation in the portal database 440. Component 461 can also store an association between the implicit derivation and the user that performed the page 425 modification.

Portlet palette 465 can be a user interface metaphor for adding portlets to pages 425. A portlet palette 465 can be a graphical representation of a set of portlets 420 that a user can add to a portal page 425 through drag and drop. Typically the portlet palette 465 can be easier to utilize than the manual layout interface 460, and is therefore often preferably used by users for customizing portals.

Figure 5:
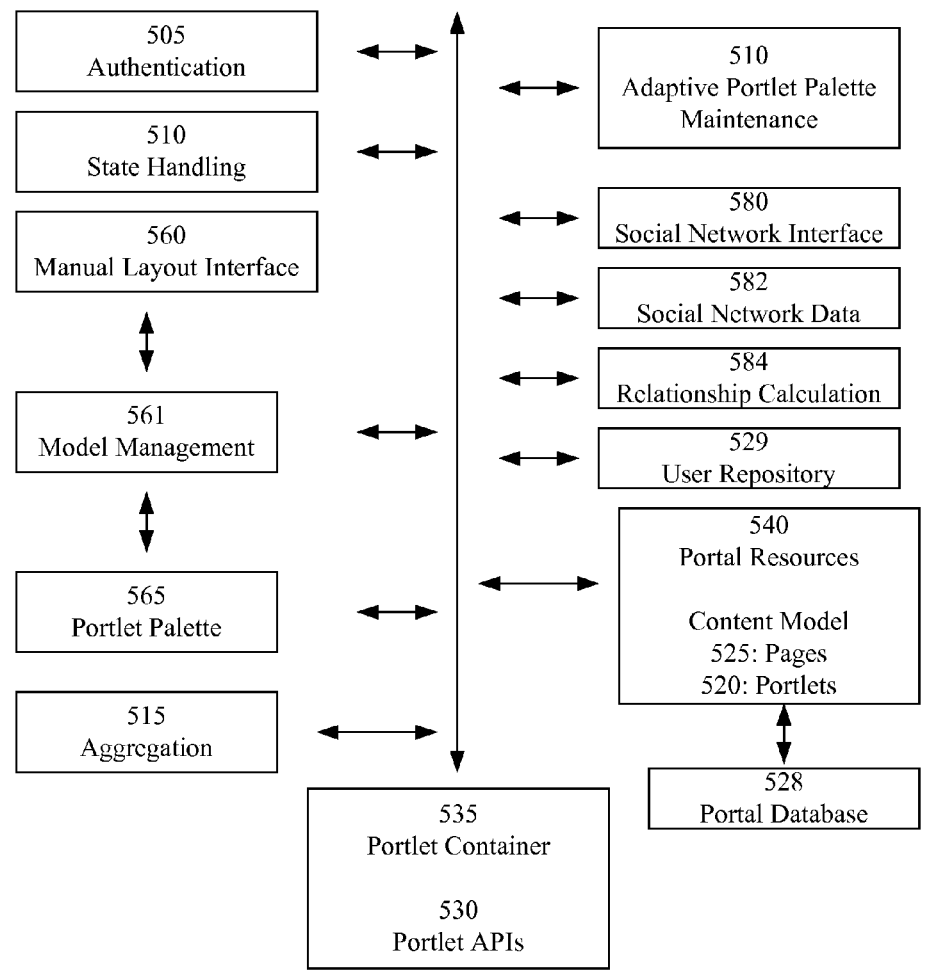
FIG. 5 is a schematic diagram of a portal server that dynamically populates a portlet palette based upon portal configurations used by other users having a relationship with a current user in accordance with the inventive arrangements disclosed herein.

FIG. 5 is a schematic diagram of a portal server 500 that dynamically populates a portlet palette based upon portal configurations used by other users having a relationship with a current user in accordance with the inventive arrangements disclosed herein. Server 500 can be one embodiment for implementing components of system 300. Server 400 includes many logical components existent in conventional portal servers, such as user authentication 505, state handling 510, aggregation 515 of fragments, a set of portlets 520, a user repository 429, portlet container software 535, portal storage resources 540, a manual layout interface 560, a model management component 561, a portal palette 565, and an aggregator 570. Additionally, server 400 can include an adaptive portlet populator 412, a social networking interface 580, social networking data store 582, and a relationship calculator 584. As used herein, social networking data is broadly defined to include any relationship data existing between two or more individuals.

The social network interface 580 can connect server 500 to an associated social network, such as IBM FRINGE, FACEBOOK, MYSPACE, etc. Interface 580 can alternatively connect server 500 to a repository of social networking and/or relationship data, which may be distinct from a particular social network. For example, an social networking proxy can gather, process, and reconcile social networking data from multiple different sources (that can themselves include social networking sites). This processed data can be used by components of system 500 instead of using "raw" social networking data acquired straight from a social networking source. Social network interface 580 can facilitate connecting to an application program interface (API) of a specific social network or other data source that permits server 500 to acquire social network data and to place it in the social networking data store 582. Although data shown as being stored in data store 582 can be directly acquired on demand when needed, performance can be improved by locally maintaining a data set acquired from remotely located social networking sources.

Relationship calculation 540 can offer functionality to compute measures representing the degree of relationship between users in the social network. Computations can be based on the social network data that is available from social network data 530 or through the social network interface 520.

It should be noted that server 400 and server 500 of FIGS. 4-5 are provided to illustrate contemplated embodiments of the invention. These embodiments can be combined to create a hybrid implementation that dynamically and automatically populates a portlet palette based upon semantic tags and related user configurations. Additionally, other techniques for dynamically populating a portlet palette based upon user and/or context specific factors are contemplated. For example, in one embodiment, a most popular set of portlets can be used to populate the portlet palette regardless of whether these users are strongly related to a current user. In one embodiment, a user can configure a set of parameters used to alter the technique used for that user when automatically populating a portlet palette.

Figure 6:
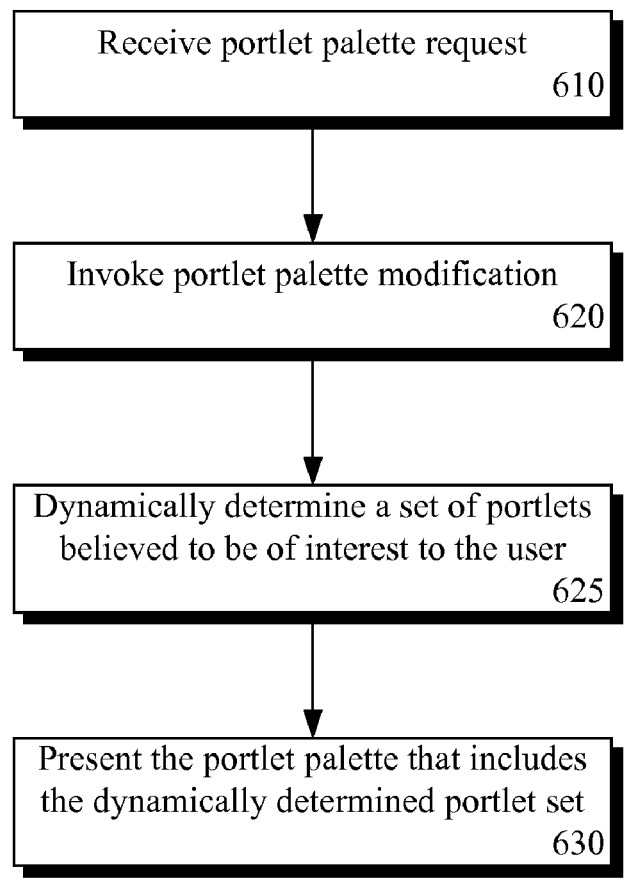
FIG. 6 is a flow chart of a method for dynamically handling portlet palette requests in accordance with an embodiment of the inventive arrangements disclosed herein.

FIG. 6 is a flow chart of a method 600 for dynamically handling portlet palette requests in accordance with an embodiment of the inventive arrangements disclosed herein. Method 600 can be performed in context of system 300.

In method 600, when a user chooses to show a portlet palette (e.g., by clicking on the appropriate visual control that is contained on the portal page), a request can be sent from a client that is received by a portal server, as shown by step 610. After receiving this request, a portlet palette modification action can be automatically invoked, as shown by step 620. The modification action causes a portlet palette populator to dynamically determine a set of portlets believed to be of interest to a user, as shown by step 625. These determined portlets can be added to an existing set of portlets presented in the portlet palette or can replace existing items of a default portlet palette configuration. Step 630 can present the portlet palette that includes the dynamically populated portlet items to a user. Subsequent actions can be taken that involve the portal palette and items included therein. For example, a user can select one of the items for inclusion in a portal using standard techniques.

Figure 7:
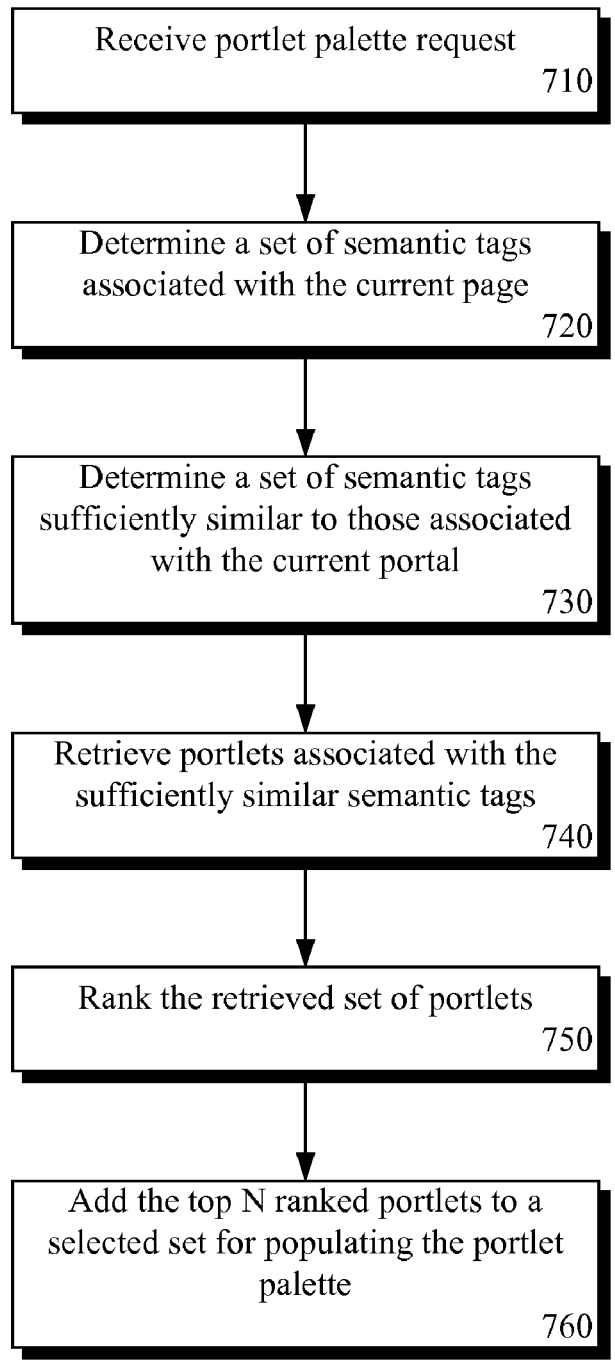
FIG. 7 is a flow chart of a method for dynamically handling portlet palette requests using semantic tags for determining items placed in a portlet palette in accordance with an embodiment of the inventive arrangements disclosed herein.

FIG. 7 is a flow chart of a method 700 for dynamically handling portlet palette requests using semantic tags for determining items placed in a portlet palette in accordance with an embodiment of the inventive arrangements disclosed herein. Method 700 can be performed in context of system 300 or server 400.

In method 700, a portlet palette invocation request can be received by a portlet palette populator component, as shown by step 710. In step 720, a set of semantic tags associated with a current portal page can be determined, such as by issuing a query to the semantic tagging component 480. The set of semantic tags can be extracted from semantic tagging information associated with portlets of a current portal page as well as semantic tagging information associated with the currently displayed portal page itself. In step 730, a similarity calculator (e.g., calculator 482) can be invoked to determine a set of semantic tags sufficiently similar to those associated with a current portal. These similar tags can be related to a set of portlets contained in a repository. The set of portlets (identifiers or pointers to these portlets) can be retrieved, as shown by step 740.

In other words, a portlet palette populator can determine a set of candidate portlets having tags similar to those determined in step 730. These candidate portlets can be ranked in an order that reflects a degree of association between the portlet and the passed tags, as shown by step 750. In step 750, the candidate set of portlets can be sorted, filtered, and/or ordered according to this determined rank. In step 760, a highest ranking set of portlets (top N) can be selected and/ordered by ranking (determined in step 750). The number of portlets (N) can be a configurable value. The selected set of portlets can be dynamically and automatically added to the portlet palette, which can be presented to a user. Subsequent actions (not shown in FIG. 7) can be taken that involve the portal palette and items included therein.

Figure 8:
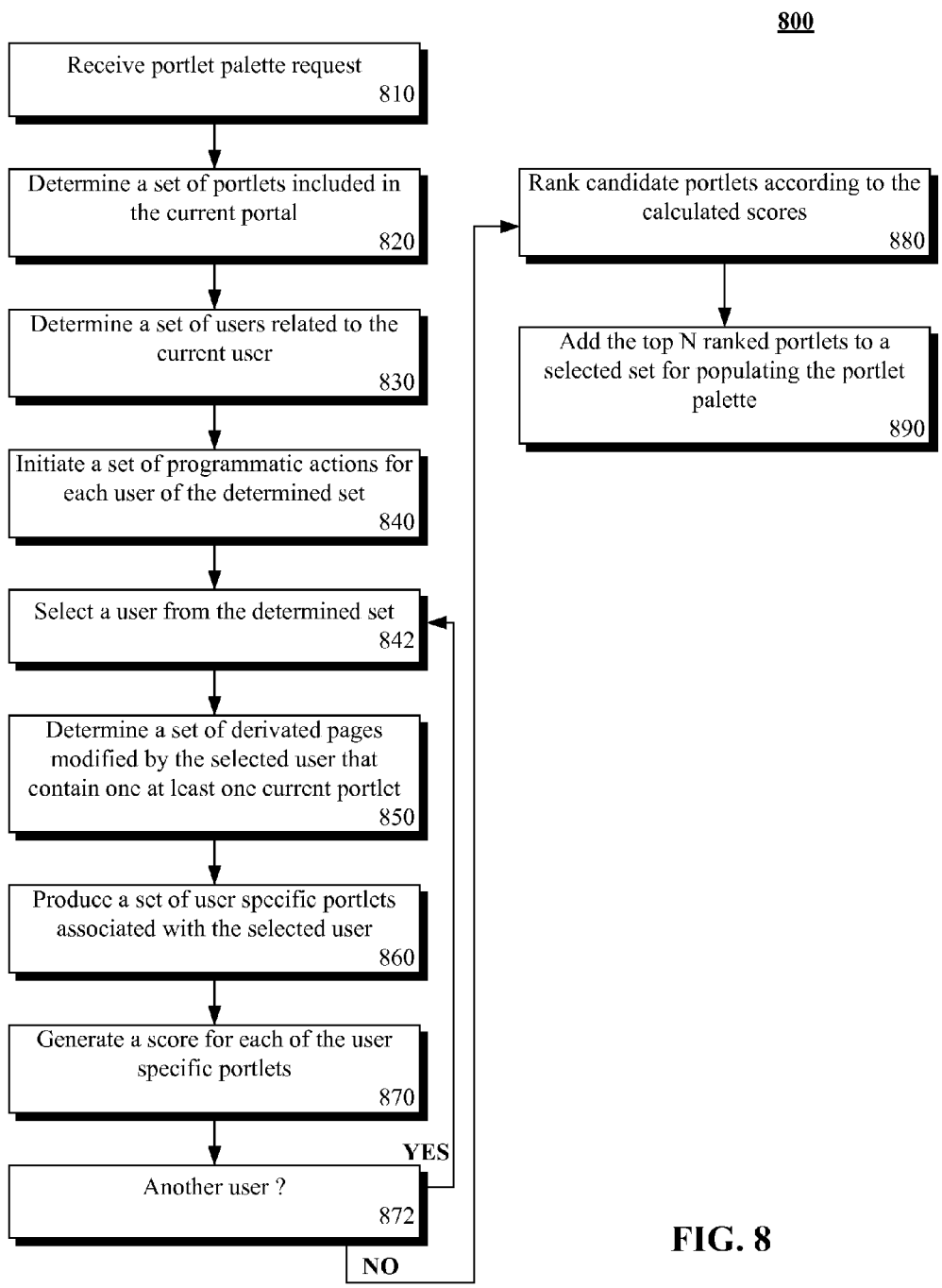
FIG. 8 is a flow chart of a method for dynamically handling portlet palette requests using user relationships in accordance with an embodiment of the inventive arrangements disclosed herein.

FIG. 8 is a flow chart of a method 800 for dynamically handling portlet palette requests using user relationships in accordance with an embodiment of the inventive arrangements disclosed herein. Method 800 can be performed in context of system 300 or server 500.

In method 800, a portlet palette invocation request can be received by a portlet palette populator component, as shown by step 810. For example, a current user (CU) can choose to show a portlet palette within a user interface (e.g. by clicking on the appropriate visual control that is contained on the portal page). This causes a request to be sent to a portal server. After receiving this request, the portal server can invoke a portlet palette component (e.g., component 565). Component 565 can trigger a portlet population component to perform programmatic actions that dynamically and automatically adjusts the items of the portlet palette.

In step 820, a set of portlets included within a current portal can be determined. In step 830, a set of users (U) that are related to the current user (CU) can be determined. Step 830 can query a data store containing previously gathered social network data or can directly query a social network for a set of related users. A set of actions then occurs for each user contained in the Set U, shown by step 840.

A user identifier of one of the users of Set U is determined in step 842 and a portal customizations specific to that user are retrieved. Specifically a set of derived pages as modified by that user that contain at least one of the portals in Set P are determined, as shown by step 850. This results in a set of pages PA for that user that were modified by and that are potentially are of interest to the current user (CU), as shown by step 860. Each page in the set PA can be provided a "score" that has been modified to reflect a degree of relationship existing between the current user CU and the user of Set U being analyzed, as shown by step 870. When each page for a current user is handled (step 872), a next user (if any) of the Set U can be handled, shown by looping from step 872 back to step 842. The score calculated in step 870 can be cumulative, meaning that a score increases each time a user of Set U includes a related portlet in a modified user-specific page. When no more users exist in Set U, the method 800 can progress from step 872 to step 880.

Step 880 can rank the candidate portlets according to their calculated score (determined in step 870). In step 890 the highest ranking portlets (top N, where N is a configurable number) can form a selected portlet set believed to be of interest to the current user (CU). The selected set of portlets can be dynamically and automatically added to the portlet palette, which can be presented to a user. Subsequent actions (not shown in FIG. 8) can be taken that involve the portal palette and items included therein.

The diagrams in FIGS. 3-8 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of dynamically populating a portlet palette comprising:
    associating via computer program instructions executed via a processor semantic tags with each of a plurality of stored portlets and with at least one of an open portal or open portlets contained within the open portal, wherein each semantic tag provides semantic information for the portlet or portal for which it is associated, and wherein each semantic tag comprises user entered data;
    detecting via computer program instructions executed via a processor an event to initialize a portlet palette within a user interface having the open portal to which the portlet palette is associated, wherein the portlet palette is a user interface control comprising a portlet set of at least one portlet, wherein said portlet palette is configured so that a selection of a portlet from the portlet set causes the portlet to be added to the open portal;
    comparing via computer program instructions executed via a processor the semantic information contained within the semantic tags of the stored portlets against the semantic information contained within the semantic tags of at least one of the open portal and the open portlets;
    automatically determining via computer program instructions executed via a processor a set of portlets from a plurality of stored portlets that are relevant to the open portal based upon results of comparing the semantic information;
    dynamically populating via computer program instructions executed via a processor the portlet palette with the determined set of portlets; and
    presenting via computer program instructions executed via a processor the populated portlet palette within the user interface.

2. The method of claim 1, wherein said semantic tags comprise user assigned meta-data semantically describing a purpose of the portal or portlet that is associated with one of said semantic tags, wherein the semantic tags of the stored portlets used when comparing the semantic information are semantic tags created by a user of the user interface.

3. The method of claim 1, further comprising:
    storing records via computer program instructions executed via a processor to relate user identity to a user specific configuration for a portal, where the user specific configuration comprises a configuration set of portlets;
    determining via computer program instructions executed via a processor an identity of a current user of the open portal;
    ascertaining via computer program instructions executed via a processor at least one other user having a relationship strength with the current user over a previously configured threshold, wherein the relationship strength is based upon a social networking relationship existing between the current user and the other user, wherein said social networking relationship is determined from interactions between the current user and the other user occurring through at least one social networking site, said social networking data being stored in a repository of social networking data accessible by a server responsible for dynamically populating said palette utilizing a social networking interface of the server;
    querying via computer program instructions executed via a processor the stored records of the at least one other user to determine the configuration set of portlets of the other user; and
    said automatically determining via computer program instructions executed via a processor the set of portlets, automatically determining said set of portlets from a plurality of stored portlets that are relevant to the open portal based upon results of comparing the semantic information and based upon portlets of the determined configuration set associated with the other user, wherein the determined set of portlets used to dynamically populate the portlet palette comprise at least one portlet from the results of comparing the semantic information of the semantic tags and comprise at least one portlet from the configuration set of portlets of the other user, wherein the set of relevant portlets comprises the portlets of the determined configuration set associated with each of the at least one other user.

4. A computer program product for dynamically populating a portlet palette comprising:
    a computer usable storage medium comprising a physical storage medium having computer usable program code stored therewith, the computer usable program code comprising:
    computer usable program code configured to associate semantic tags with each of a plurality of stored portlets and with at least one of an open portal or open portlets contained within the open portal, wherein each semantic tag provides semantic information for the portlet or portal for which it is associated, and wherein each semantic tag comprises user entered data;
    computer usable program code configured to detect an event to initialize a portlet palette within a user interface having the open portal to which the portlet palette is associated, wherein the portlet palette is a user interface control comprising a portlet set of at least one portlet, wherein said portlet palette is configured so that a selection of a portlet from the portlet set causes the portlet to
be added to the open portal;
computer usable program code configured to compare via
the semantic information contained within the semantic
tags of the stored portlets against the semantic information contained within the semantic tags of at least one of
the open portal and the open portlets;
computer usable program code configured to automatically determine a set of portlets from a plurality of stored
portlets that are relevant to the open portal based upon
results of comparing the semantic information;
computer usable program code configured to dynamically
populate the portlet palette with the determined set of
portlets; and
computer usable program code configured to present the
populated portlet palette within the user interface.

5. The computer program product of claim 4, wherein said semantic tags comprise user assigned meta-data semantically describing a purpose of the portal or portlet that is associated with one of said semantic tags, wherein the semantic tags of the stored portlets used when comparing the semantic information are semantic tags created by a user of the user interface.

6. The computer program product of claim 4, further comprising:
computer usable program code configured to store records
to relate user identity to a user specific configuration for
a portal, where the user specific configuration comprises
a configuration set of portlets;
computer usable program code configured to determine an
identity of a current user of the open portal;
computer usable program code configured to ascertain at
least one other user having a relationship strength with
the current user over a previously configured threshold,
wherein the relationship strength is based upon a social
networking relationship existing between the current
user and the other user, wherein said social networking
relationship is determined from interactions between the
current user and the other user occurring through at least
one social networking site, said social networking data
being stored in a repository of social networking data
accessible by a server responsible for dynamically populating said palette utilizing a social networking interface
of the server;
computer usable program code configured to query the
stored records of the at least one other user to determine
the configuration set of portlets of the other user; and
computer usable program code configured to determine
said set of portlets from a plurality of stored portlets that
are relevant to the open portal based upon results of
comparing the semantic information and based upon
portlets of the determined configuration set associated
with the other user, wherein the determined set of portlets used to dynamically populate the portlet palette
comprise at least one portlet from the results of comparing the semantic information of the semantic tags and
comprise at least one portlet from the configuration set
of portlets of the other user, wherein the set of relevant
portlets comprises the portlets of the determined configuration set associated with each of the at least one
other user.

7. A system for dynamically populating a portlet palette comprising:
a processor;
a non-volatile memory;
a volatile memory; and
a bus communicatively linking said processor, said non-volatile memory, and said volatile memory, wherein said
processor is operable to execute programmatic instructions contained in the volatile memory, wherein said
non-volatile memory is a computer usable medium that
stores computer usable program code executable by said
plurality of processing cores, said computer usable program code being configured to:
associate semantic tags with each of a plurality of stored
portlets and with at least one of an open portal or open
portlets contained within the open portal, wherein
each semantic tag provides semantic information for
the portlet or portal for which it is associated, and
wherein each semantic tag comprises user entered
data;
detect an event to initialize a portlet palette within a user
interface having the open portal to which the portlet
palette is associated, wherein the portlet palette is a
user interface control comprising a portlet set of at
least one portlet, wherein said portlet palette is configured so that a selection of a portlet from the portlet
set causes the portlet to be added to the open portal;
compare via the semantic information contained within
the semantic tags of the stored portlets against the
semantic information contained within the semantic
tags of at least one of the open portal and the open
portlets;
automatically determine a set of portlets from a plurality
of stored portlets that are relevant to the open portal
based upon results of comparing the semantic information;
dynamically populate the portlet palette with the determined set of portlets; and
present the populated portlet palette within the user
interface.

8. The system of claim 7, wherein said semantic tags comprise user assigned meta-data semantically describing a purpose of the portal or portlet that is associated with one of said semantic tags, wherein the semantic tags of the stored portlets used when comparing the semantic information are semantic tags created by a user of the user interface.

9. The system of claim 7, said computer usable program code being further configured to:
store records to relate user identity to a user specific configuration for a portal, where the user specific configuration comprises a configuration set of portlets;
determine an identity of a current user of the open portal;
ascertain at least one other user having a relationship
strength with the current user over a previously configured threshold, wherein the relationship strength is
based upon a social networking relationship existing
between the current user and the other user, wherein said
social networking relationship is determined from interactions between the current user and the other user
occurring through at least one social networking site,
said social networking data being stored in a repository
of social networking data accessible by a server responsible for dynamically populating said palette utilizing a
social networking interface of the server;
query the stored records of the at least one other user to
determine the configuration set of portlets of the other
user; and
determine said set of portlets from a plurality of stored
portlets that are relevant to the open portal based upon
results of comparing the semantic information and based
upon portlets of the determined configuration set associated with the other user, wherein the determined set of portlets used to dynamically populate the portlet palette comprise at least one portlet from the results of comparing the semantic information of the semantic tags and comprise at least one portlet from the configuration set of portlets of the other user, wherein the set of relevant portlets comprises the portlets of the determined configuration set associated with each of the at least one other user.

* * * * *